(12) United States Patent
Han

(10) Patent No.: US 7,926,551 B2
(45) Date of Patent: Apr. 19, 2011

(54) HEATER CORE AND AIR CONDITIONER FOR AN AUTOMOBILE EQUIPPED WITH SAME

(75) Inventor: Seong Seok Han, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 737 days.

(21) Appl. No.: 11/931,132

(22) Filed: Oct. 31, 2007

(65) Prior Publication Data

US 2008/0099184 A1 May 1, 2008

(30) Foreign Application Priority Data

Oct. 31, 2006 (KR) .................. 10-2006-0106774

(51) Int. Cl.
*B60H 1/12* (2006.01)
(52) U.S. Cl. ............... 165/42; 165/103; 165/283
(58) Field of Classification Search ............ 165/42, 165/103, 280, 283, 284, 294
See application file for complete search history.

(56) References Cited

U.S. PATENT DOCUMENTS

| | | | | |
|---|---|---|---|---|
| 4,972,877 A | * | 11/1990 | Halemba et al. | 137/625.29 |
| 6,253,837 B1 | * | 7/2001 | Seiler et al. | 165/103 |
| 6,945,323 B2 | * | 9/2005 | Tsunoda | 165/103 |

FOREIGN PATENT DOCUMENTS

JP 2005-080262 3/2005

* cited by examiner

*Primary Examiner* — Teresa J Walberg
(74) *Attorney, Agent, or Firm* — Lowe Hauptman Ham & Berner LLP

(57) ABSTRACT

The present invention relates to a heater core and an air conditioner for an automobile equipped with the same, in which an amount of cooling water introduced into the heater core can be adjusted based on a temperature set by a user, thereby increasing a cooling and heating efficiency.

The heater core comprises first and second tanks 210 and 220 which are spaced apart from each other at a predetermined distance; inlet pipe 211 and outlet pipe 212 which are respectively connected to the first tank 210 or second tank 220 and through which cooling water is introduced and discharged; a plurality of tubes 230 of which both ends are respectively fixed between the first and second tanks 210 and 220; a fins 250 which are provided between the tubes 230; a cooling water introduction part 330 which is formed at one side of the inlet pipe 211 and through which the cooling water is introduced; a bypass line 340 which is also formed at one side of the inlet pipe 211 and through which the cooling water is discharged without passing through the heater core H; and a flow rate adjusting means 300 for adjusting an amount of the cooling water introduced into the heater core H.

5 Claims, 8 Drawing Sheets

(a)

(b)

(a)

(b)

HEATER CORE AND AIR CONDITIONER FOR AN AUTOMOBILE EQUIPPED WITH SAME

RELATED APPLICATION

The present application is based on, and claims priority from, KR Application Number 10-2006-0106774, filed Oct. 31, 2006, the disclosure of which is hereby incorporated by reference herein in its entirety.

TECHNICAL FIELD

The present invention relates to a heater core and an air conditioner for an automobile equipped with the same, and more particularly, to a heater core and an air conditioner for an automobile equipped with the same, in which an amount of cooling water introduced into the heater core can be adjusted based on a temperature set by a user, thereby increasing a cooling and heating efficiency.

BACKGROUND ART

In the recent automotive industry, according as the global interest in environment and energy is increased, there has been performed research and development in the improvement of fuel efficiency. And, in order to satisfy various users' requirements, there has been also proceeded research and development in light, small and multi-functional automobiles. In particular, in the air conditioning system for an automobile, since it is generally difficult to secure a sufficient space in an engine room, it is required that the air conditioner for an automobile has a small size and functions to effectively control temperature and air flow.

In general, the air conditioner for an automobile serves to maintain a proper temperature within the car during summer and winter seasons or removes frost and moisture generated on a window of the car during winter season and rainy day so that a driver can secure a visual field for both front and rear sides. In the air conditioner, external air is passed through an evaporator or heater core in which the cooling water is flowed, and then distributed through vents communicated with each portion in the car in a status of cool or warm air by using a ventilating part.

FIG. 1 shows a cross-sectional view of a conventional air conditioner for an automobile. The conventional air conditioner includes a case 100 having a vent 110, 120, 130 of which an opening degree is controlled by a door 110d, 120d, 130d; a ventilating part 140 which is connected with an air inlet portion of the case 100 so as to ventilate external air; an evaporator E and a heater core H provided in the case 100; and a temp door 150 for opening and closing a cool air passage P1 and a warm air passage P2 in the case 100. In the conventional air conditioner as described above, when an air cooling cycle is operated, the temp door 150 opens the coo air passage P1 and, at the same time, closes the warm air passage P2. Therefore, the air ventilated by the ventilating part 140 is heat-exchanged with the cooling water in the evaporator E, while passed through the Evaporator E, so as to be changed into the cool air. Then, the cool air is guided to the cool air passage P1 and discharged to the inside of the car through the opened vents 110, 120 and 130, thereby cooling the inside of the car.

Further, when an air heating cycle is operated, the temp door 150 closes the cool air passage P1 and, at the same time, opens the warm air passage P2. Therefore, the air ventilated by the ventilating part 140 is heat-exchanged with the cooling water in the heater core H, while passed through the Heater core H, so as to be changed into the warm air. Then, the warm air is discharged to the inside of the car through the opened vents 110, 120 and 130, thereby heating the inside of the car.

FIG. 2 is a perspective view of two kinds of conventional heater cores H, wherein FIG. 2(a) shows a U-turn type heater core and FIG. 2(b) shows a one-way type heater core. Referring to FIG. 2, the conventional heater core H includes a pair of first and second tanks 210 and 220, inlet and outlet pipes 211 and 212 which are connected to the first tank 210 or second tank 220 and through which the cooling water is introduced and discharged, a plurality of tubes 230 of which both ends are respectively fixed to the first and second tanks 210 and 220 so as to form cooling water passages, and fins 250 provided between the tubes 230.

In FIGS. 1 and 2, the same reference numerals are assigned to the same parts as those in a heater core and an air conditioner having the heater core according to the present invention.

However, in the conventional air conditioner as described above, since the evaporator and the heater core are respectively positioned at specific places, and the temp door for controlling the opening degree of each of the cool air passage and the warm air passage during the air cooling and heating cycle is provided, the space in the engine room corresponding to a radius of operation of the temp door has to be occupied, and further, since the air conditioner has a complicated structure which is an obstacle to the air flow, it is difficult to obtain the proper air flow and there is generated undesirable noise.

Furthermore, since the conventional heater core can not control an amount of cooling water introduced into the heater core, high temperature cooling water may be continuously flowed into the heater core during the air cooling cycle. Therefore, even though the warm air passage is closed by the temp door, a temperature of the external air is increased by the high temperature cooling water and thus the cooling efficiency is deteriorated.

DISCLOSURE OF THE INVENTION

It is an object of the present invention to provide a heater core and an air conditioner for an automobile equipped with the same, in which an amount of cooling water introduced into the heater core can be precisely adjusted by using flow rate adjusting means, based on a temperature set by a user, thereby controlling an internal temperature of the automobile.

It is another object of the present invention to provide a heater core and an air conditioner for an automobile equipped with the same, in which a separate temp door is not used so as to efficiently utilize a space in the engine room, and the flow rate adjusting means is interlocked with a sub-door so as to increase the cooling and heating efficiency.

In order to achieve the above objects of the present invention, there is provided a heater core comprising first and second tanks 210 and 220 which are spaced apart from each other at a predetermined distance; inlet pipe 211 and outlet pipe 212 which are respectively connected to the first tank 210 or second tank 220 and through which cooling water is introduced and discharged; a plurality of tubes 230 of which both ends are respectively fixed between the first and second tanks 210 and 220; a fins 250 which are provided between the tubes 230; a cooling water introduction part 330 which is formed at one side of the inlet pipe 211 and through which the cooling water is introduced; a bypass line 340 which is also formed at one side of the inlet pipe 211 and through which the cooling water is discharged without passing through the heater core H; and a flow rate adjusting means 300 for adjusting an amount of the cooling water introduced into the heater core H.

Preferably, wherein the flow rate adjusting means 300 comprises a hollow body 310; a cover 320 for airtightly covering the body 310; a ball valve 350 which is rotatably provided in the body 310 so as to be coupled with a driving shaft 353 at a center portion thereof and also formed with first and second communication parts 351 and 352 connected with each other so as to control an amount of the cooling water introduced through the cooling water introduction part 330, which is discharged through the bypass line 340, and an amount of the cooling water which is introduced to the inlet pipe 211 of the heater core H, respectively, by the rotation of the ball valve 350; and a driving means (not shown) for driving the ball valve 350.

Preferably, the driving means of the flow rate adjusting means 300 rotates the ball valve 350 so that, in the maximum cooling operation, the first and second communication parts 351 and 352 open the cooling water introduction part 330 and the bypass line 340 and thus the cooling water introduced through the cooling water introduction part 330 is discharged through the bypass line 340, and in the maximum heating operation, the first and second communication parts 351 and 352 open the cooling water introduction part 330 and the inlet pipe 211 and thus the cooling water introduced through the cooling water introduction part 330 is flowed into the heater core H through the inlet pipe 211.

Preferably, in a status that the heater core H is installed at an air conditioner, the outlet pipe 212 is positioned at an upper side than the flow rate adjusting means 300, and the outlet pipe 212 is connected to the bypass line 340 so as to be stepped, or to form an acute angle therebetween.

Further, an air conditioner for an automobile according to the present invention comprises a case 100 having vents 110, 120 and 130 of which opening degree is controlled by each door 110*d*, 120*d*, 130*d*; an evaporator E provided in the case 100; a heater core H provided in the case 100 and having a flow rate adjusting means 300; and a sub-door of which opening degree is controlled according to a cooling and heating operation so as to adjust an amount of air passing through the heater core H, wherein the heater core H is a heater core as set forth in any one of claim 1 to claim 4, and a driving means of the flow rate adjusting means 300 is connected with the sub-door 160 so as to be interlocked with it.

[Detailed Description of Main Elements]

| | |
|---|---|
| 100: case | 110, 120, 130: vent |
| 110d, 120d, 130d: vent door | 140: ventilating part |
| 150: temp door | 160: sub-door |
| E: evaporator | H: heater core |
| 210: first tank | 211: inlet pipe |
| 212: outlet pipe | 220: second tank |
| 230: tube | 240: end plate |
| 250: fin | |
| 300: flow rate adjusting means | |
| 310: body | 320: cover |
| 330: cooling water introduction part | |
| 340: bypass line | 350: ball valve |
| 351: first communication part | |
| 352: second communication part | 353: driving shaft |

BEST MODE FOR CARRYING OUT THE INVENTION

Practical and presently preferred embodiments of the present invention are illustrative as shown in the following Examples and Comparative Examples.

Figure 1:
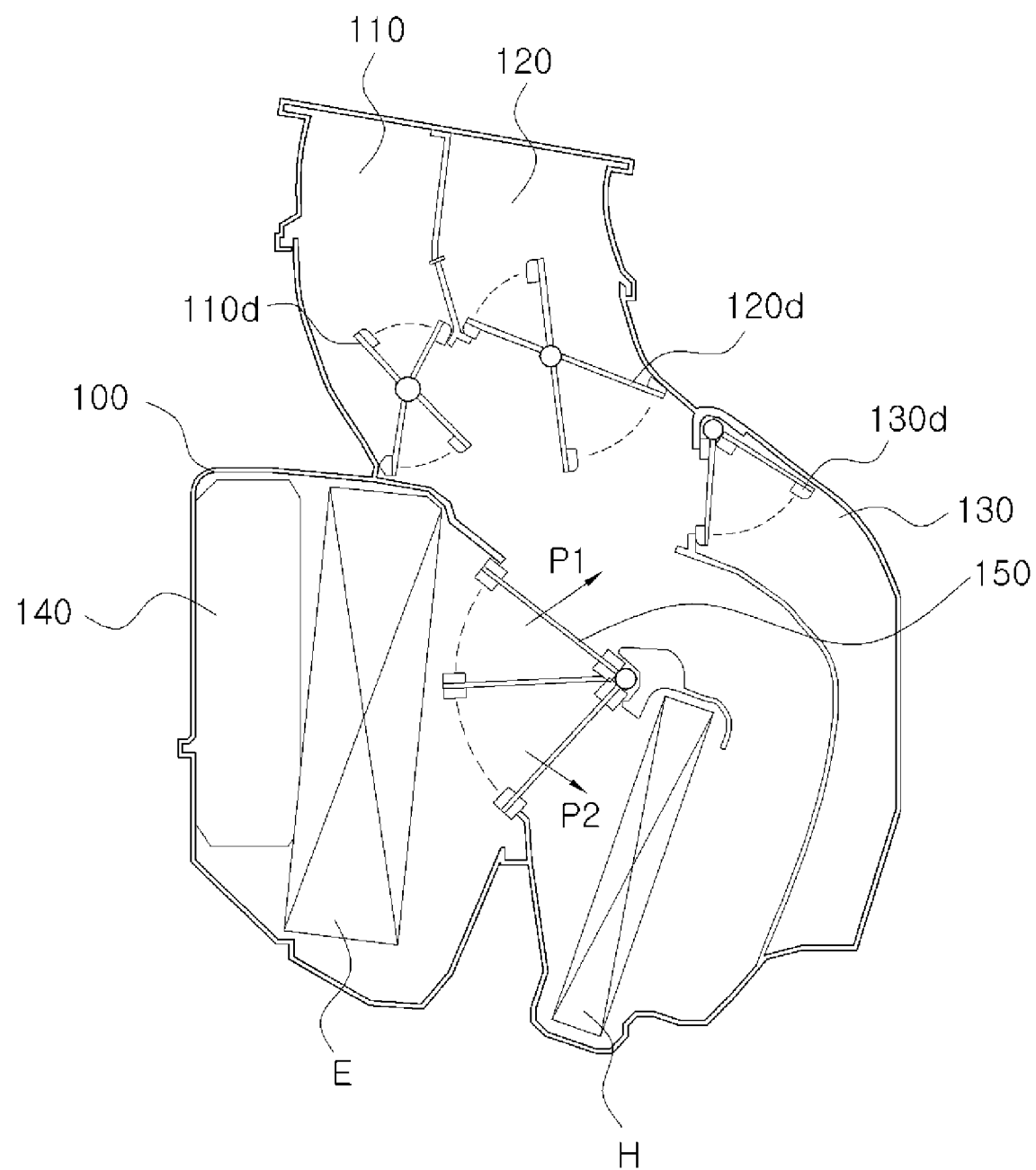
FIG. 1 is a perspective view of a conventional air conditioner for an automobile.
Figure 2:
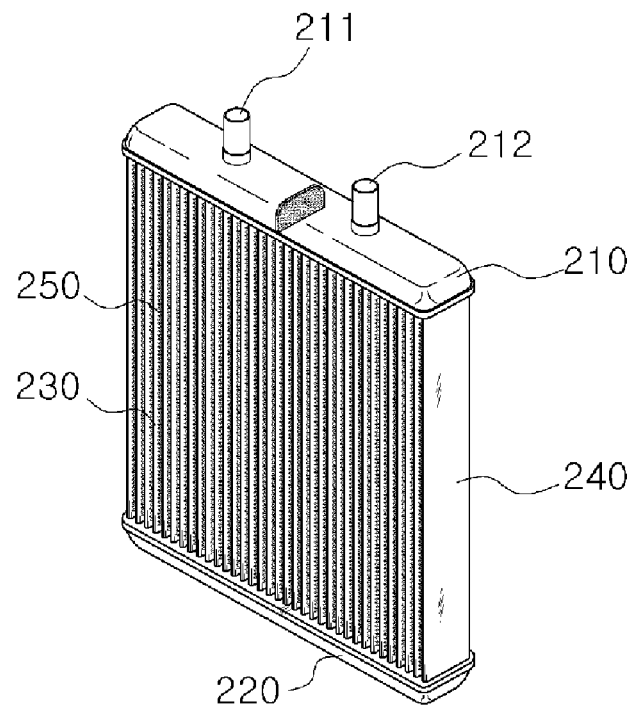
FIG. 2 is a perspective view of a conventional heater core.
Figure 2:
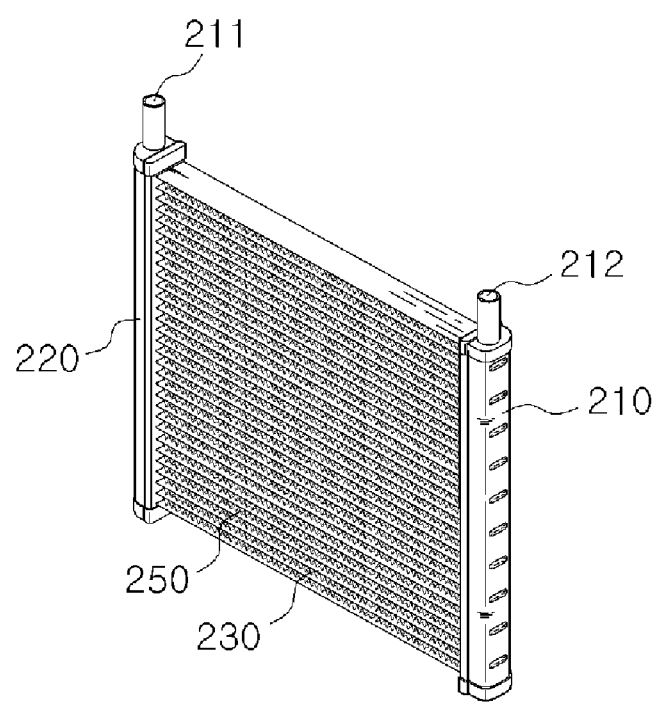
Figure 3:
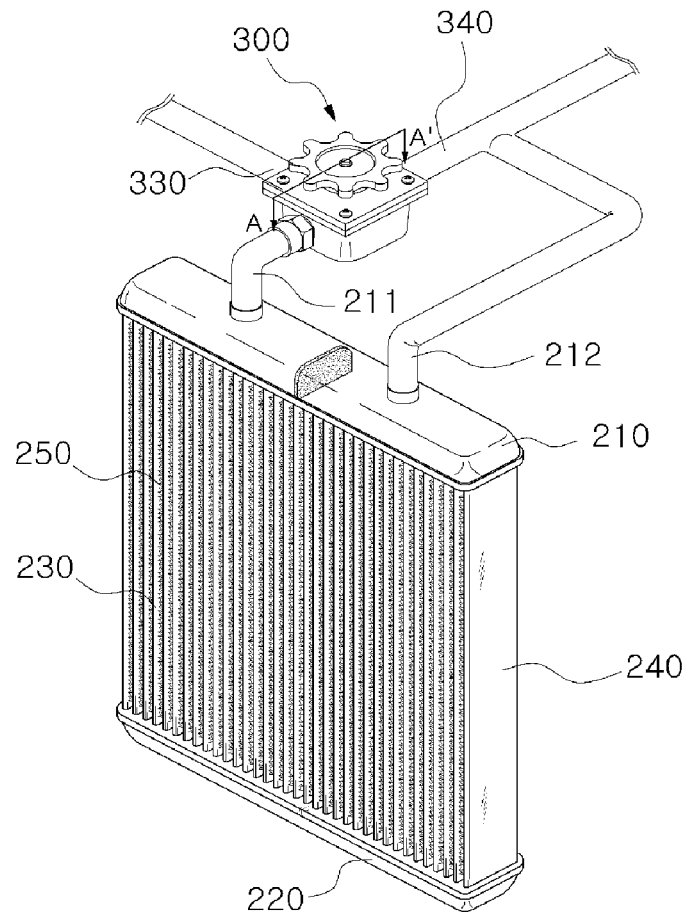
FIG. 3 is a perspective view of a heater core according to the present invention.

FIG. 3 is a perspective view of a heater core according to the present invention. Referring to FIG. 3, the heater core H of the present invention includes first and second tanks 210 and 220, inlet and outlet pipes 211 and 212 which are formed at the first tank 210 or second tank 220 and through which cooling water is introduced and discharged, a tube 230 which is fixed between the first and second tanks 210 and 220 so as to form a cooling water passage, and a fins 250 provided between the tubes 230. And flow rate adjusting means 300 is provided at one side of the inlet pipe 211 and also provided with a bypass line 340.

Further, the flow rate adjusting means includes a hollow body 310; a cover 320 for airtightly closing the body 310; a ball valve 350 which is rotatably provided in the body 310 so as to be coupled with a driving shaft 353 at a center portion thereof and also formed with first and second communication parts 351 and 352 connected with each other so as to control an amount of the cooling water introduced through a cooling water introduction part 330, which is discharged through the bypass line 340, and an amount of the cooling water which is introduced to the inlet pipe 211 of the heater core H, respectively, by the rotation of the ball valve 350; and a driving means (not shown) for driving the ball valve 350.

Figure 4:
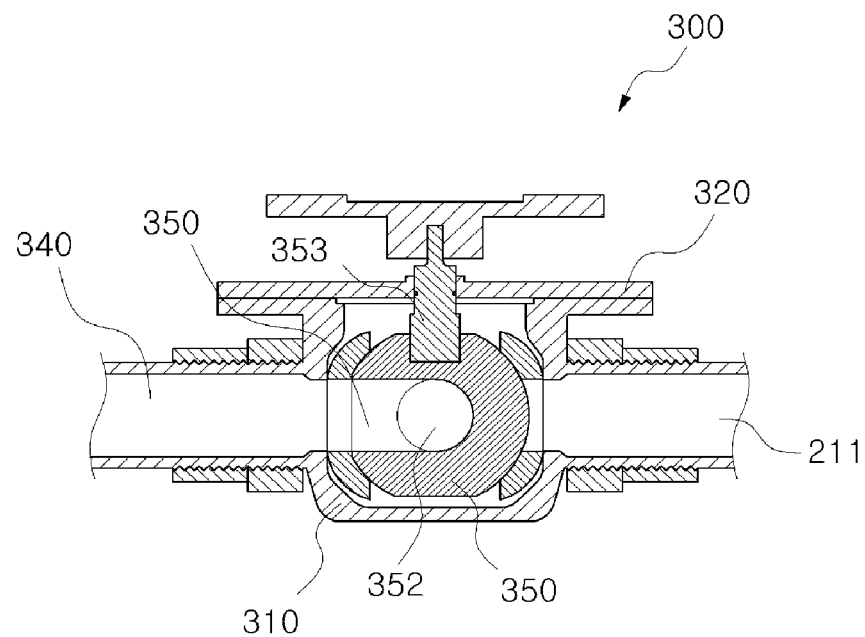
FIG. 4 is a cross-sectional view taken along a line A-A of FIG. 3.
Figure 5:
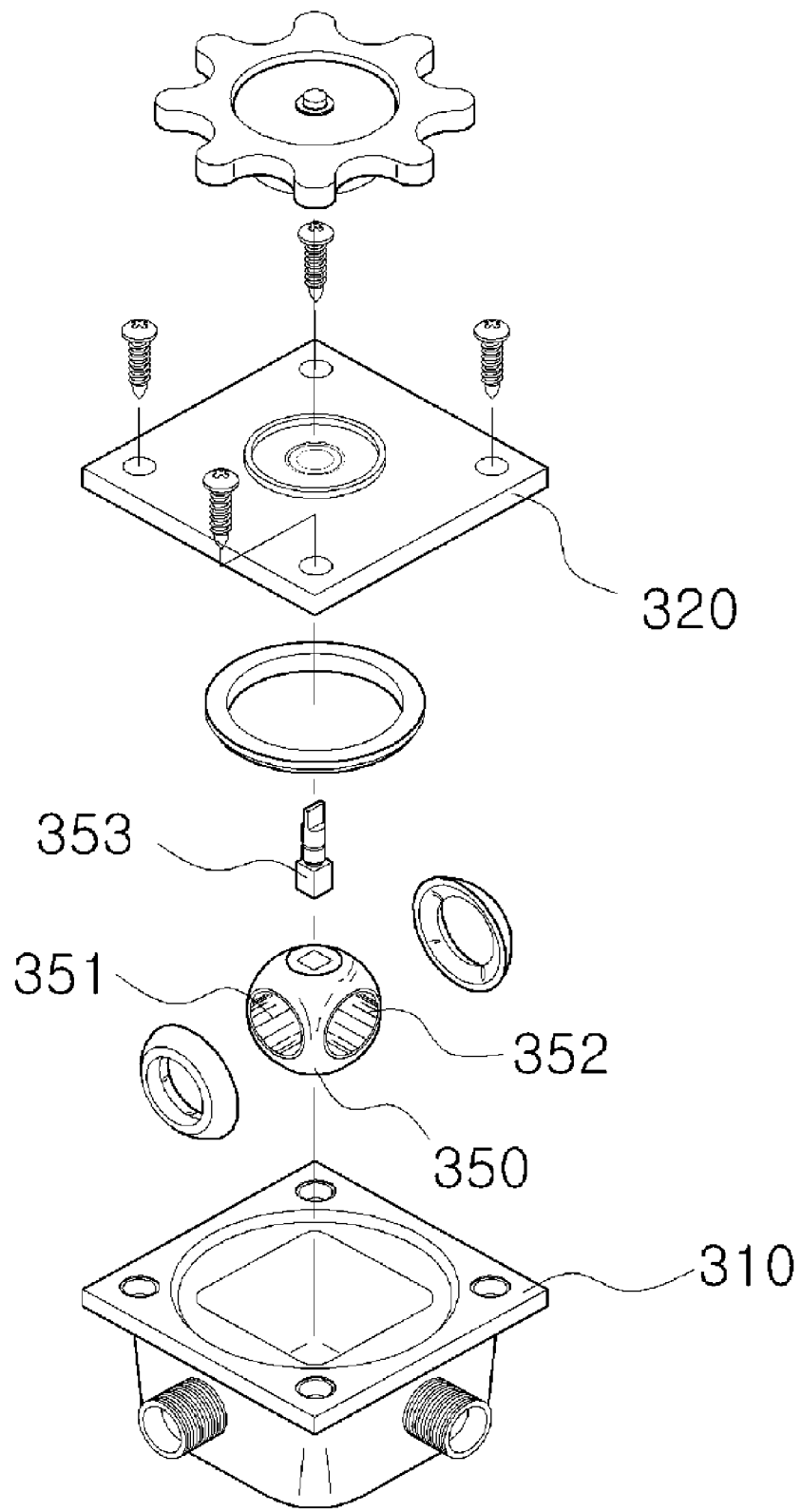
FIG. 5 is an exploded perspective view of a flow rate adjusting means according to the present invention.

FIG. 4 is a cross-sectional view taken along a line A-A of FIG. 3, and FIG. 5 is an exploded perspective view of the flow rate adjusting means 300 according to the present invention.

The hollow body 310 is a fundamental part of the flow rate adjusting means 300 and functions to distribute the introduced cooling water to the bypass line 340 or the inlet pipe 211.

The inlet pipe 211 of the heater core H is connected to one side of the body 310, the cooling water introduction part 330 is formed at a lower side of the body 310 to introduce the cooling water into the body 310, and the bypass line 340 is formed on an extension line of the inlet pipe 310 connected to the body 310 so as to discharge the cooling water introduced into the body 310.

The bypass line 340 is connected with the outlet pipe 212 of the heater core H so that the cooling water introduced through the inlet pipe 211 is circulated through the heater core H and then discharged through the outlet pipe 211 and the bypass line 340. That is, in the flow rate adjusting means 300, when a part or whole parts of the cooling water introduced through the inlet pipe 211 to the heater core H is blocked, the cooling water introduced through the cooling water introduction part 330 is bypassed through the bypass line 340.

It is preferable that the body 310 has the cover 320 for airtightly closing an upper surface of the body 310.

Figure 6:
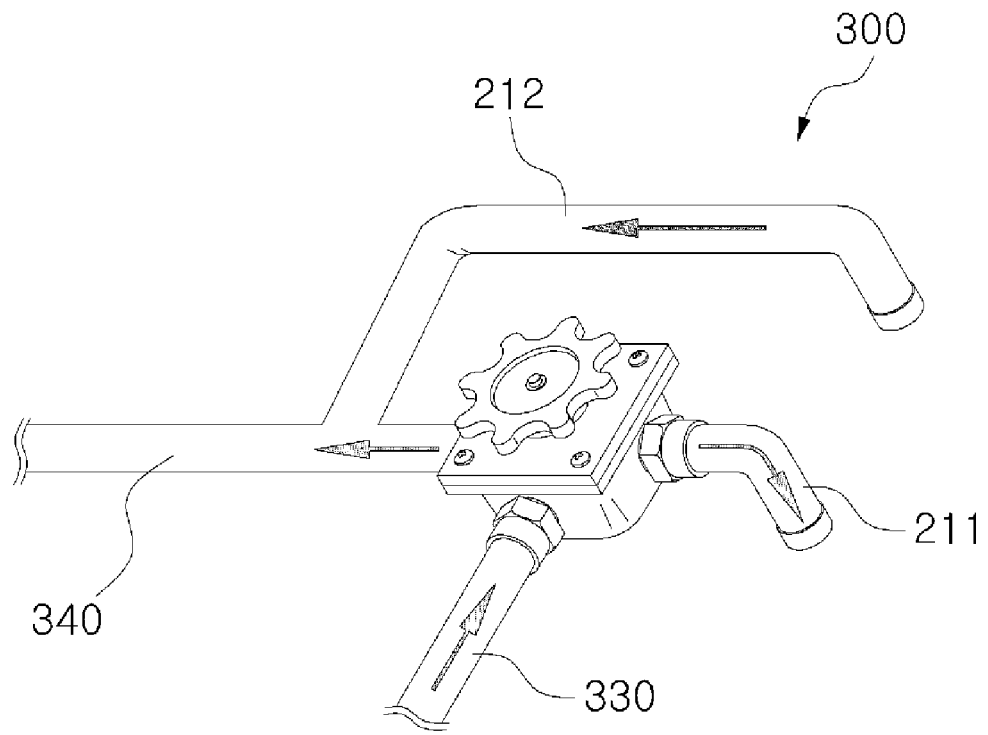
FIG. 6 is a perspective view of the flow rate adjusting means for the heater core of FIG. 3.
Figure 6:
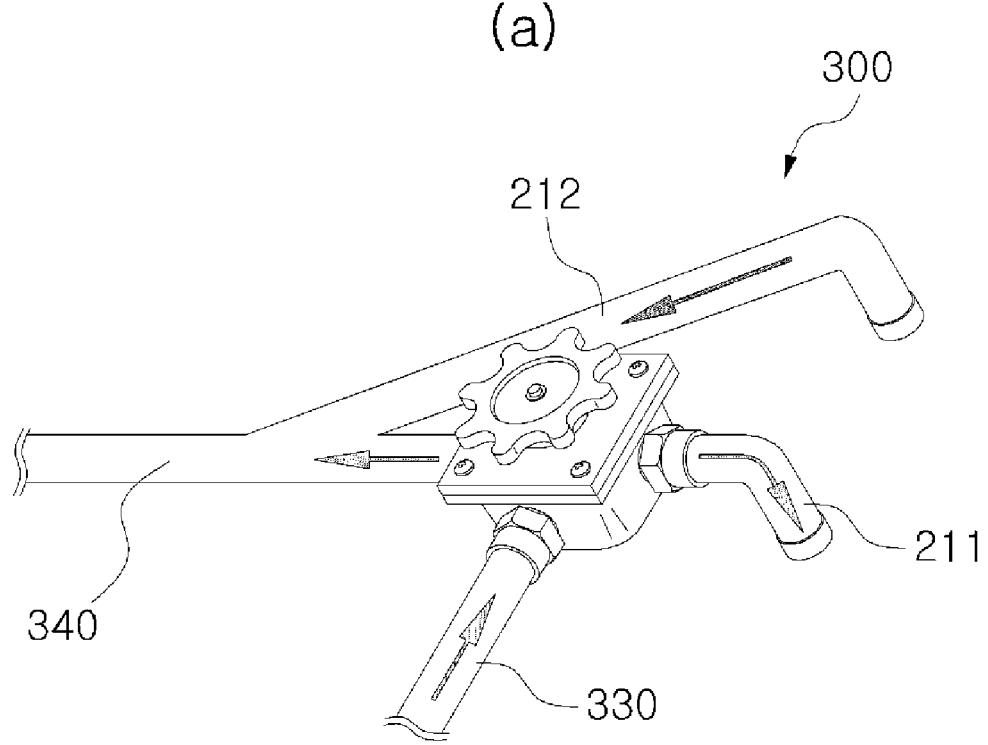

FIG. 6 is a perspective view of the flow rate adjusting means 300 for the heater core of FIG. 3, wherein FIG. 6(*a*) shows an embodiment in which the outlet pipe 212 is connected to the bypass line 340 so as to be stepped, and FIG. 6(*b*) shows another embodiment in which the outlet pipe 212 is connected to the bypass line 340 so as to form an acute angle therebetween.

In the heater core H of the present invention, it is preferable that the outlet pipe 212 is positioned at an upper side than the flow rate adjusting means 300 so that the cooling water discharged from the heater core H is not flowed back to the heater core H. Besides the constructions of FIGS. 6(*a*) and 6(*b*), other structure for preventing the back flow of the cooling water may be employed.

Moreover, in the body, there is provided the ball valve 350 in which the driving shaft 353 is provided at a center portion thereof and which is formed with first and second communication parts 351 and 352 connected with each other so as to control an amount of the cooling water which is discharged through the bypass line 340, and an amount of the cooling water which is introduced to the inlet pipe 211 of the heater core H, respectively, by the rotation of the ball valve 350.

The first and second communication parts 351 and 352 may be formed to be crossed at right angles to each other. In this case, it is further easy to control an amount of the cooling water by rotating the ball valve 350.

The ball valve 350 functions to distribute the cooling water introduced through the cooling water introduction part 330 into the body 310 to the bypass line 340 or the inlet pipe 211.

In addition, it is preferable that the heater core H of the present invention further includes a sealing member corresponding to a shape of the ball valve 350.

Preferably, the sealing member further includes Teflon corresponding to the shape of the ball valve 340 and rubber wrapping an outside of the Teflon. Although the sealing member has a shape corresponding to the shape of the ball valve 350, there is a risk that the cooling water introduced in the body 310 may be leaked. To prevent the leakage of the cooling water, the rubber wrapping the outside of the Teflon allows the sealing member to be further compressed toward the ball valve 350 by the elasticity of the rubber.

In FIG. 5, two sealing members are provided at both sides of the ball valve 350. However, according to the sealing ability required in the flow rate adjusting means 300, one or more sealing members may be provided.

The driving means is connected with the driving shaft 353 of the ball valve 350 so as to properly rotate the ball valve 350.

In the maximum cooling operation, the driving means rotates the ball valve 350 so that the first and second communication parts 351 and 352 open the cooling water introduction part 330 and the bypass line 340 and thus the cooling water introduced through the cooling water introduction part 330 is discharged through the bypass line 340. In the maximum heating operation, the first and second communication parts 351 and 352 open the cooling water introduction part 330 and the inlet pipe 211 and thus the cooling water introduced through the cooling water introduction part 330 is flowed to the heater core H through the inlet pipe 211.

Meanwhile, the air conditioner for an automobile according to the present invention includes a case 100 having vents 110, 120 and 130 of which opening degree is controlled by each door 110*d*, 120*d*, 130*d*; an evaporator E provided in the case 100; the heater core H provided in the case 100 and having the flow rate adjusting means 300; and a sub-door of which opening degree is controlled according to the cooling and heating operation so as to adjust an amount of air passing through the heater core H, wherein the heater core H has a property as described above, and a driving means of the flow rate adjusting means 300 is connected with the sub-door 160 so as to be interlocked.

Figure 7A:
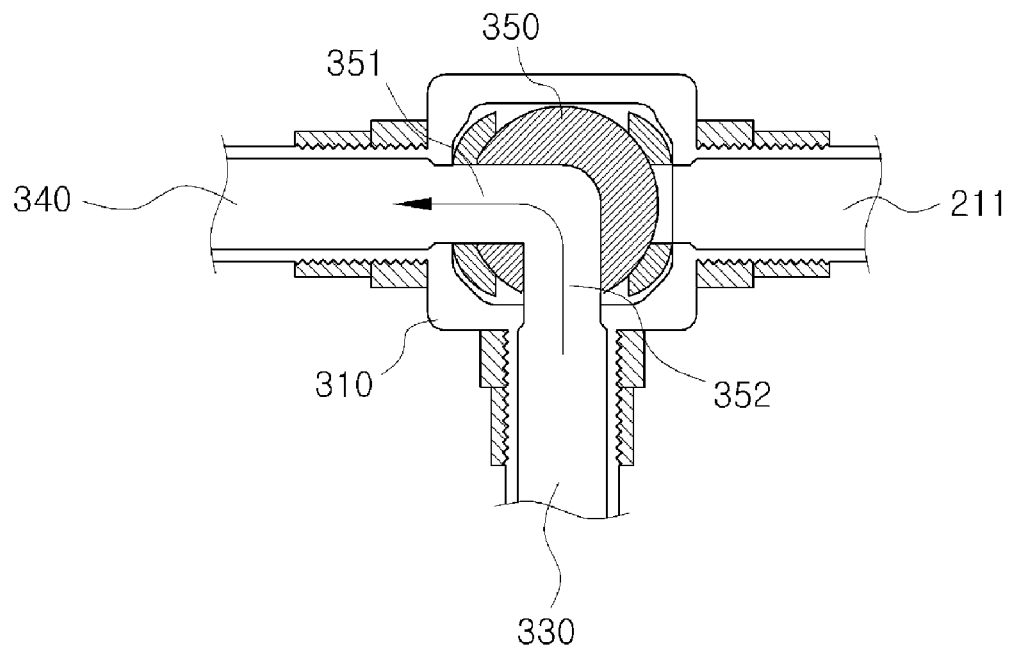
FIGS. 7*a* and 7*b* are cross-sectional views of the flow rate adjusting means for the heater core and the air conditioner for the automobile during a maximum cooling operation.
Figure 7B:
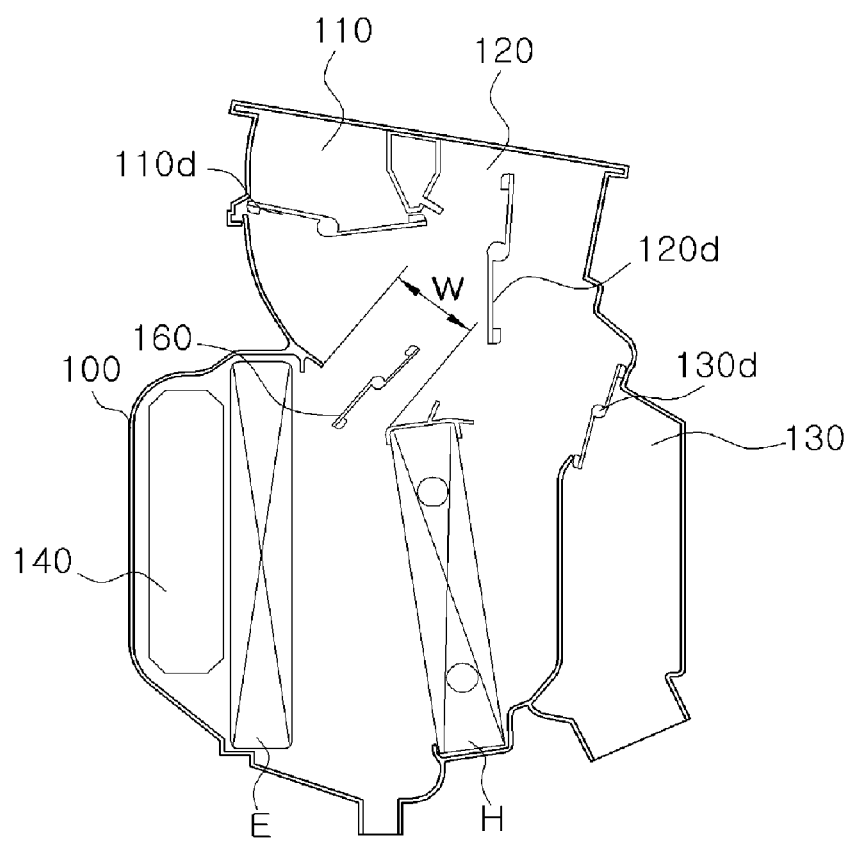
Figure 8A:
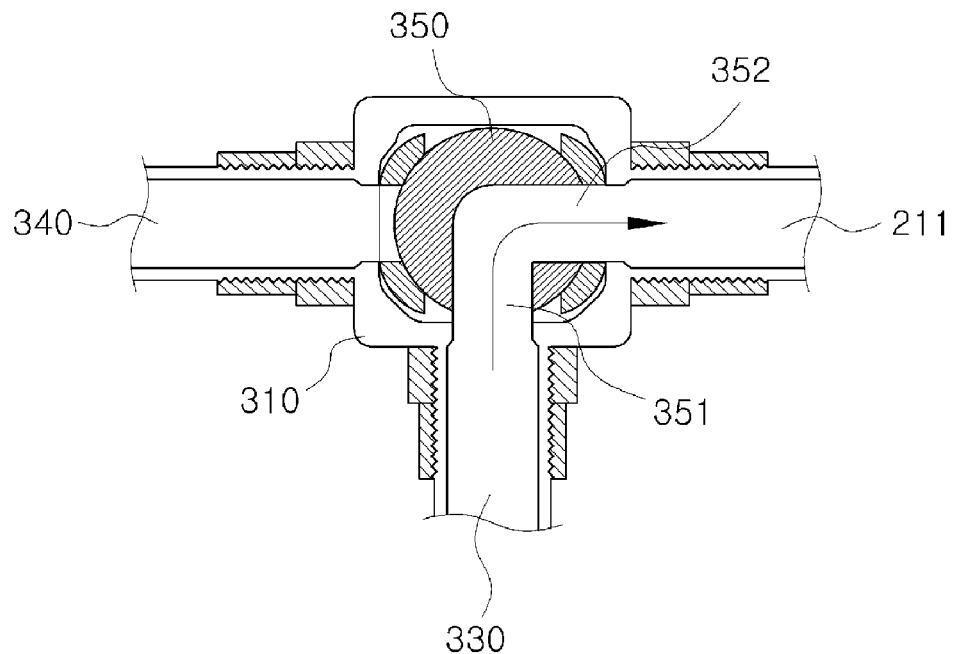
FIGS. 8*a* and 8*b* are cross-sectional views of the flow rate adjusting means for the heater core and the air conditioner for the automobile during a maximum heating operation.
Figure 8B:
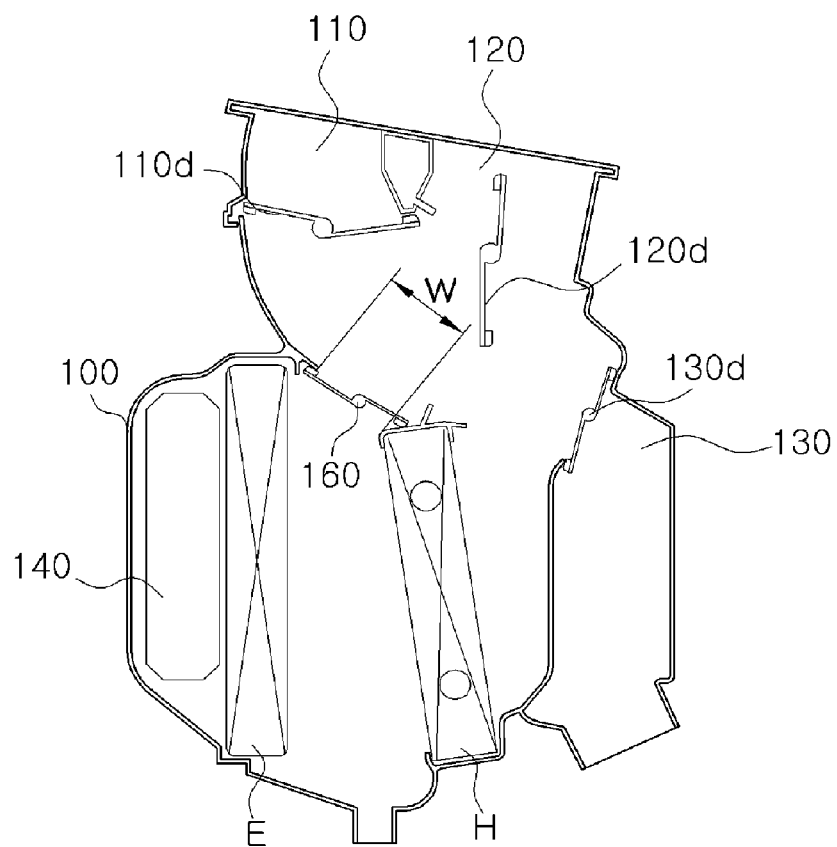
Figure 9:
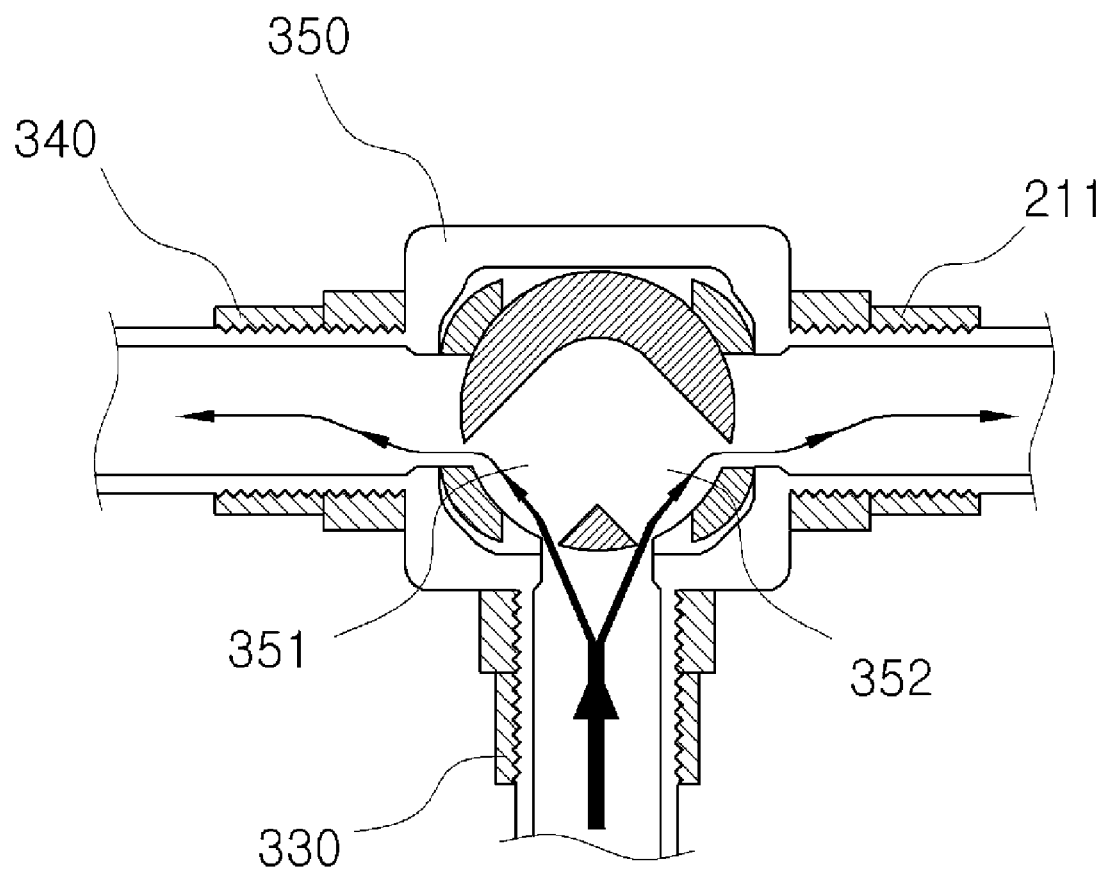
FIG. 9 is a cross-sectional view of the flow rate adjusting means according to another embodiment of the present invention.

FIGS. 7*a* and 7*b* are cross-sectional views of the flow rate adjusting means 300 for the heater core H and the air conditioner for the automobile during the maximum cooling operation, FIGS. 8*a* and 8*b* are cross-sectional views of the flow rate adjusting means 300 for the heater core H and the air conditioner for the automobile during the maximum heating operation, and FIG. 9 is a cross-sectional view of the flow rate adjusting means 300 according to another embodiment of the present invention.

As shown in FIG. 7*a*, in the maximum cooling operation, the first communication part 351 opens the bypass line 340 by the rotation of the ball valve 350 and the second communication part 352 opens the cooling water introduction part 330. Thus, the cooling water is introduced through the cooling water introduction part 330 and the second communication part 352 into the body 310 and then discharged through the first communication part 351 and the bypass line 340.

As described above, in the maximum cooling operation, it is prevented that the cooling water of a high temperature is introduced into the heater core H. To the end, the air conditioner has the sub-door 160 as shown in FIG. 7*b*, and during the maximum cooling operation, the sub-door 160 is opened so that the air passed through the evaporator E can be passed without passing through the heater core H, thereby further increasing the cooling efficiency.

As shown in FIG. 8*a*, in the maximum heating operation, the first communication part 351 opens the cooling water introduction part 330 by the rotation of the ball valve 350 and the second communication part 352 opens the inlet pipe 211 of the heater core H. Thus, the cooling water is introduced through the cooling water introduction part 330 and the first communication part 351 into the body 310 and then introduced through the inlet pipe 211 and the second communication part 352 into the heater core H.

Further, during the maximum heating operation, as shown in FIG. 8*b*, the sub-door 160 is closed so that the air passed through the evaporator E is passed through the heater core H, thereby increasing the heating efficiency.

That is, in the air conditioner for an automobile according to the present invention, the driving means of the flow rate adjusting means 300 is connected with the sub-door 160 so that the flow rate adjusting means 300 and the sub-door 160 are operated according to the cooling or heating operation set by a user, thereby constantly changing the temperature. Thus, it is easy to control the temperature and also it is possible to increasing the cooling and heating efficiency.

As shown in FIG. 9, when the user selects a middle section between the cooling and heating operations, the first communication part 351 opens only a part of each of the inlet pipe 211 and the cooling water introduction part 330, and the second communication part 352 opens only a part of each of the cooling water introduction part 330 and the bypass line 340, so that a part of the cooling water introduced through the cooling water introduction part 330 is flowed through the inlet pipe 211 to the heater core H and the rest is discharged through the bypass line 340.

Preferably, the state that the first and second communication parts 351 and 352 of the ball valve 350 is in the state as shown in FIG. 7a and the sub-door 160 is in the state as shown in FIG. 7b, and the state that the first and second communication parts 351 and 352 is in the state as shown in FIG. 8a and the sub-door 160 is in the state as shown in FIG. 8b are divided into a plurality of set states so as to control a rotational angle of each of the ball valve 350 and the sub-door 160 according to the temperature set by the user, thereby facilely controlling the internal temperature of the automobile.

INDUSTRIAL APPLICABILITY

According to the heater core and the air conditioner for an automobile with the same of the present invention, as described above, since the heater core is provided with the flow rate adjusting means, it is possible to effectively control the internal temperature of the automobile, and further since it is not necessary to employ a separate temp door, it is possible to effectively utilize an internal space of the engine room and also increase the cooling and heating efficiency.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A heater core comprising:
   first and second tanks which are spaced apart from each other at a predetermined distance;
   an inlet pipe and an outlet pipe which are respectively connected to the first tank or second tank and through which cooling water is introduced and discharged;
   a plurality of tubes of which both ends are respectively fixed between the first and second tanks;
   fins which are provided between the tubes; and
   a flow rate adjusting means
   wherein the flow rate adjusting means includes:
      a hollow body, including a cooling water introduction part, through which cooling water is introduced, connected to one side thereof and bypass lines vertically formed at both sides of the cooling water introduction part, respectively, to discharge the cooling water not passing through the inlet pipe and the heater core;
      a cover airtightly covering the body;
      a ball valve provided in the body having a driving shaft connected to a center portion thereof and formed with first and second communication parts vertically connected to each other to control an amount of the cooling water introduced into the cooling water introduction part and discharged through the bypass line and an amount of the cooling water introduced into the inlet pipe of the heater core by rotation; and
      a driving means driving the ball valve, and
   wherein in a state that the heater core is installed at an air conditioner, the outlet pipe is positioned at an upper side from the flow rate adjusting means, and the outlet pipe is connected to the bypass line so as to be stepped, or to form an acute angle therebetween.

2. The heater core as set forth in claim 1, wherein the driving means of the flow rate adjusting means rotates the ball valve so that, in the maximum cooling operation, the first and second communication parts open the cooling water introduction part and the bypass line and thus the cooling water introduced through the cooling water introduction part is discharged through the bypass line, and in the maximum heating operation, the first and second communication parts open the cooling water introduction part and the inlet pipe and thus the cooling water introduced through the cooling water introduction part is flowed into the heater core through the inlet pipe.

3. An air conditioner for an automobile, comprising:
   a case having vents of which opening degree is controlled by each door;
   an evaporator provided in the case;
   a heater core provided in the case and having a flow rate adjusting means; and
   a sub-door of which opening degree is controlled according to a cooling and heating operation so as to adjust an amount of air passing through the heater core,
   wherein the heater core is a heater core as set forth in claim 1, and a driving means of the flow rate adjusting means is connected with the sub-door so as to be interlocked with it.

4. An air conditioner for an automobile, comprising:
   a case having vents of which opening degree is controlled by each door;
   an evaporator provided in the case;
   a heater core provided in the case and having a flow rate adjusting means; and
   a sub-door of which opening degree is controlled according to a cooling and heating operation so as to adjust an amount of air passing through the heater core,
   wherein the heater core is a heater core as set forth in claim 3, and a driving means of the flow rate adjusting means is connected with the sub-door so as to be interlocked with it.

5. A heater core comprising:
   first and second tanks which are spaced apart from each other at a predetermined distance;
   an inlet pipe and an outlet pipe which are respectively connected to the first tank or second tank and through which cooling water is introduced and discharged;
   a plurality of tubes of which both ends are respectively fixed between the first and second tanks;
   fins which are provided between the tubes; and
   a flow rate adjuster comprising:
      a hollow body, including a cooling water introduction part, through which cooling water is introduced, connected to one side thereof and bypass lines vertically formed at both sides of the cooling water introduction part, respectively, to discharge the cooling water not passing through the inlet pipe and the heater core;
      a cover airtightly covering the body;
      a ball valve provided in the body having a driving shaft connected to a center portion thereof and formed with first and second communication parts vertically connected to each other to control an amount of the cooling water introduced into the cooling water introduction part and discharged through the bypass line and an amount of the cooling water introduced into the inlet pipe of the heater core by rotation;
   wherein in a state that the heater core is installed at an air conditioner, the outlet pipe is positioned at an upper side from the flow rate adjuster, and the outlet pipe is connected to the bypass line so as to be stepped, or to form an acute angle therebetween.

* * * * *